United States Patent
St. Romain, II

(10) Patent No.: US 11,710,324 B2
(45) Date of Patent: Jul. 25, 2023

(54) SYSTEMS AND METHODS FOR IMPROVING THE CLASSIFICATION OF OBJECTS

(71) Applicant: Toyota Research Institute, Inc., Los Altos, CA (US)

(72) Inventor: Randall J. St. Romain, II, Dexter, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 452 days.

(21) Appl. No.: 16/901,358

(22) Filed: Jun. 15, 2020

(65) Prior Publication Data
US 2021/0390351 A1    Dec. 16, 2021

(51) Int. Cl.
| | |
|---|---|
| *G06V 20/56* | (2022.01) |
| *G06V 10/44* | (2022.01) |
| *G06V 10/82* | (2022.01) |
| *G06V 20/20* | (2022.01) |
| *G06F 18/21* | (2023.01) |

(52) U.S. Cl.
CPC .......... *G06V 20/56* (2022.01); *G06F 18/2178* (2023.01); *G06V 10/454* (2022.01); *G06V 10/82* (2022.01); *G06V 20/20* (2022.01)

(58) Field of Classification Search
None
See application file for complete search history.

(56) References Cited

U.S. PATENT DOCUMENTS

| | | | |
|---|---|---|---|
| 9,478,063 B2 | 10/2016 | Rhoads et al. | |
| 10,438,050 B2 | 10/2019 | Watanabe et al. | |
| 11,335,086 B2 * | 5/2022 | Jenkins | G06V 10/255 |
| 11,468,070 B2 * | 10/2022 | Bhardwaj | G06F 16/2228 |
| 11,468,550 B2 * | 10/2022 | Cohen | G06T 7/70 |

(Continued)

FOREIGN PATENT DOCUMENTS

| | | | | |
|---|---|---|---|---|
| CN | 102625933 A | * | 8/2012 | ............. G01D 21/00 |
| CN | 103514289 A | * | 1/2014 | ........... G06F 16/288 |

(Continued)

OTHER PUBLICATIONS

Ben Hmida et al., Knowledge Base Approach for 3D Objects Detection in Point Clouds Using 3D Processing and Specialists Knowledge, International Journal on Advances in Intelligent Systems, vol. 5 No. 1 & 2 (Year: 2012).*

(Continued)

*Primary Examiner* — Mohammed Rachedine
(74) *Attorney, Agent, or Firm* — Christopher G. Darrow; Darrow Mustafa PC

(57) ABSTRACT

Systems, methods, and other embodiments described herein relate to improving the classification of objects depicted in a scene. In one embodiment, a method includes generating, using an ontological detector, a type classification of a detected object according to a detector ontology of known classes. The detected object is represented as segmented data from sensor data about a surrounding environment. The method includes, in response to determining that the type classification specifies an unknown class that is not defined in the detector ontology, annotating the segmented data as unknown. The method includes providing the segmented data to specify that the type classification for the detected object is unknown.

20 Claims, 6 Drawing Sheets

(56) References Cited

U.S. PATENT DOCUMENTS

| | | | |
|---|---|---|---|
| 2018/0349746 A1 | 12/2018 | Vallespi-Gonzalez | |
| 2018/0349785 A1 | 12/2018 | Zheng et al. | |
| 2019/0057310 A1* | 2/2019 | Olmstead | G06F 40/30 |
| 2019/0108396 A1 | 4/2019 | Dal Mutto et al. | |
| 2019/0205706 A1 | 7/2019 | Govindaraj et al. | |
| 2019/0370614 A1 | 12/2019 | Crouch et al. | |
| 2019/0384291 A1 | 12/2019 | Michalakis et al. | |
| 2021/0263962 A1* | 8/2021 | Chang | G06F 40/30 |
| 2021/0279527 A1* | 9/2021 | Zadeh | G06V 10/945 |

FOREIGN PATENT DOCUMENTS

| | | | | | |
|---|---|---|---|---|---|
| CN | 105740901 A | * | 7/2016 | | G06K 9/03 |
| CN | 106709989 A | * | 5/2017 | | G06T 17/05 |
| CN | 111428762 B | * | 3/2022 | | G06F 16/367 |

OTHER PUBLICATIONS

Hmida et al., "Knowledge Base Approach for 3D Objects Detection in Point Clouds Using 3D Processing and Specialists Knowledge", International Journal on Advances in Intelligent Systems, vol. 5 No. 1 & 2, year 2012, http://www.iariajournals.org/intelligent_systems/.

* cited by examiner

SYSTEMS AND METHODS FOR IMPROVING THE CLASSIFICATION OF OBJECTS

TECHNICAL FIELD

The subject matter described herein relates, in general, to systems and methods for improving the classification of objects depicted in a scene, and, more particularly, to developing an ontology through aggregating examples for unknown objects.

BACKGROUND

Various devices use sensors to perceive a surrounding environment. Such devices may derive information for navigating the environment, such as perceiving obstacles or may simply distinguish between objects in the surrounding environment for other purposes. For example, a robotic device may use information from the sensors to develop an awareness of the surrounding environment. In particular, the robotic device may use the perceived information to differentiate between various entities, track the entities, classify the entities, and so on. However, the ability to use this information relies on the ability of the underlying systems to accurately and efficiently process the information into the noted perceptions.

For example, while a clustering model may be able to distinguish many different clusters of data points associated with different objects from an observation of a scene, identifying a type (also referred to as a class) of the object may not be feasible for each separate cluster. That is, consider that any given environment includes a plurality of different objects. As one example, a roadway scene may include various dynamic objects, surfaces, buildings, and so on. Some of the objects may be more common than others for a particular scene, such as vehicles, pedestrians, bicyclists, traffic signs, and so on within the context of a roadway. However, many other objects may be uncommon or at least less pervasive (e.g., horses, unicycles, etc.) than objects having direct relevance to the functioning of the robotic device (e.g., autonomous vehicle).

Furthermore, because training an ontological detector to classify each separate class in an ontology is a computationally-intensive process that may require many different training examples, the ontology for the ontological detector may focus on common classes for a particular application instead of a comprehensive set of classes for many common and uncommon objects. Yet, using a limited ontology can result in a limited awareness about the surrounding environment by the robotic device since characteristics (e.g., likely movements) about some uncommon objects that the device may encounter remain unknown due to the inability to provide a classification. As such, difficulties associated with classifying objects from perceived data can persist and may result in reduced situational awareness for a device.

SUMMARY

In one embodiment, example systems and methods relate to an improved approach to classifying objects using an ontological detector. For example, in one arrangement, a disclosed system employs a novel operating architecture that functions to identify and aggregate information about unknown object classes to improve an ontology of the ontological detector while still providing relevant associations about unknown objects. In general, the present approach involves using the ontological detector trained with a defined ontology (i.e., known set of classes) to acquire additional information about unknown classes in order to subsequently expand the ontology and improve classification of further objects.

Accordingly, as the ontological detector is acquiring data about unlabeled objects and identifying/classifying the objects to, for example, provide awareness to an associated device about the surroundings, some objects may have a classification that is not previously defined in the ontology. Thus, the ontological detector may indicate that the class is unknown, and the detector does not provide a specific class label for the object. However, classifying the object as unknown represents an opportunity for the ontological detector to acquire information. That is, the ontological detector is still providing information about the object, which is that the class is not in the ontology. As such, the disclosed system may then save the object data to a local repository in order to collect information about classes unknown to the ontological detector.

Moreover, the ontological detector may further associate the object with a known class as a manner of providing a general classification without being able to precisely classify the object. For example, in an instance where a class for an object is unknown, but the object has features similar to a vehicle, the detector may indicate that the object is a vehicle-like or dynamic object that generally approximates a visual appearance or form the class of object without actually knowing the class of the object. By providing an approximation of the class, associated systems may then extrapolate the general form/dimensions and/or likely behaviors of the class to the unknown object, thereby improving further predictions and/or responses associated with the unknown object.

In any case, subsequently, the disclosed system, in one or more arrangements, may use the object data for the unknown objects as training data to train the ontological detector on the unknown classes. For example, the disclosed system may include one or more additional mechanisms for classifying the unknown object data, such as manual annotators, additional models, and so on. In general, the additional mechanisms are more robust and thus more capable of classifying the unknown object, but may not be suited for implementation within a device in the same manner as the ontological detector. Thus, the additional annotators (e.g., humans manually identifying the objects), and/or the additional models may execute in a separate training environment to produce the training data. Once the training data is made available, the system can expand the ontology by further training the ontological detector using the collected training data. In this way, the system improves the ability of the ontological detector to identify various classes of objects while providing intermediate remedies through the process of associating unknown objects with known classes.

In one embodiment, an identification system for improving the classification of objects depicted in a scene is disclosed. The identification system includes one or more processors and a memory communicably coupled to the one or more processors. The memory stores a network module including instructions that when executed by the one or more processors cause the one or more processors to generate, using an ontological detector, a type classification of a detected object according to a detector ontology of known classes. The detected object is represented as segmented data from sensor data about a surrounding environment. The network module includes instructions to, in response to determining that the type classification specifies an unknown class that is not defined in the detector ontology, annotate the segmented data as unknown. The memory stores a training module including instructions that when executed by the one or more processors cause the one or more processors to provide the segmented data to specify that the type classification for the detected object is unknown.

In one embodiment, a non-transitory computer-readable medium for improving the classification of objects depicted in a scene and including instructions that, when executed by one or more processors, cause the one or more processors to perform various functions is disclosed. The instructions include instructions to generate, using an ontological detector, a type classification of a detected object according to a detector ontology of known classes. The detected object is represented as segmented data from sensor data about a surrounding environment. The instructions include instructions to, in response to determining that the type classification specifies an unknown class that is not defined in the detector ontology, annotate the segmented data as unknown. The instructions include instructions to provide the segmented data to specify that the type classification for the detected object is unknown.

In one embodiment, a method for improving the classification of objects depicted in a scene is disclosed. In one embodiment, the method includes generating, using an ontological detector, a type classification of a detected object according to a detector ontology of known classes. The detected object is represented as segmented data from sensor data about a surrounding environment. The method includes, in response to determining that the type classification specifies an unknown class that is not defined in the detector ontology, annotating the segmented data as unknown. The method includes providing the segmented data to specify that the type classification for the detected object is unknown.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
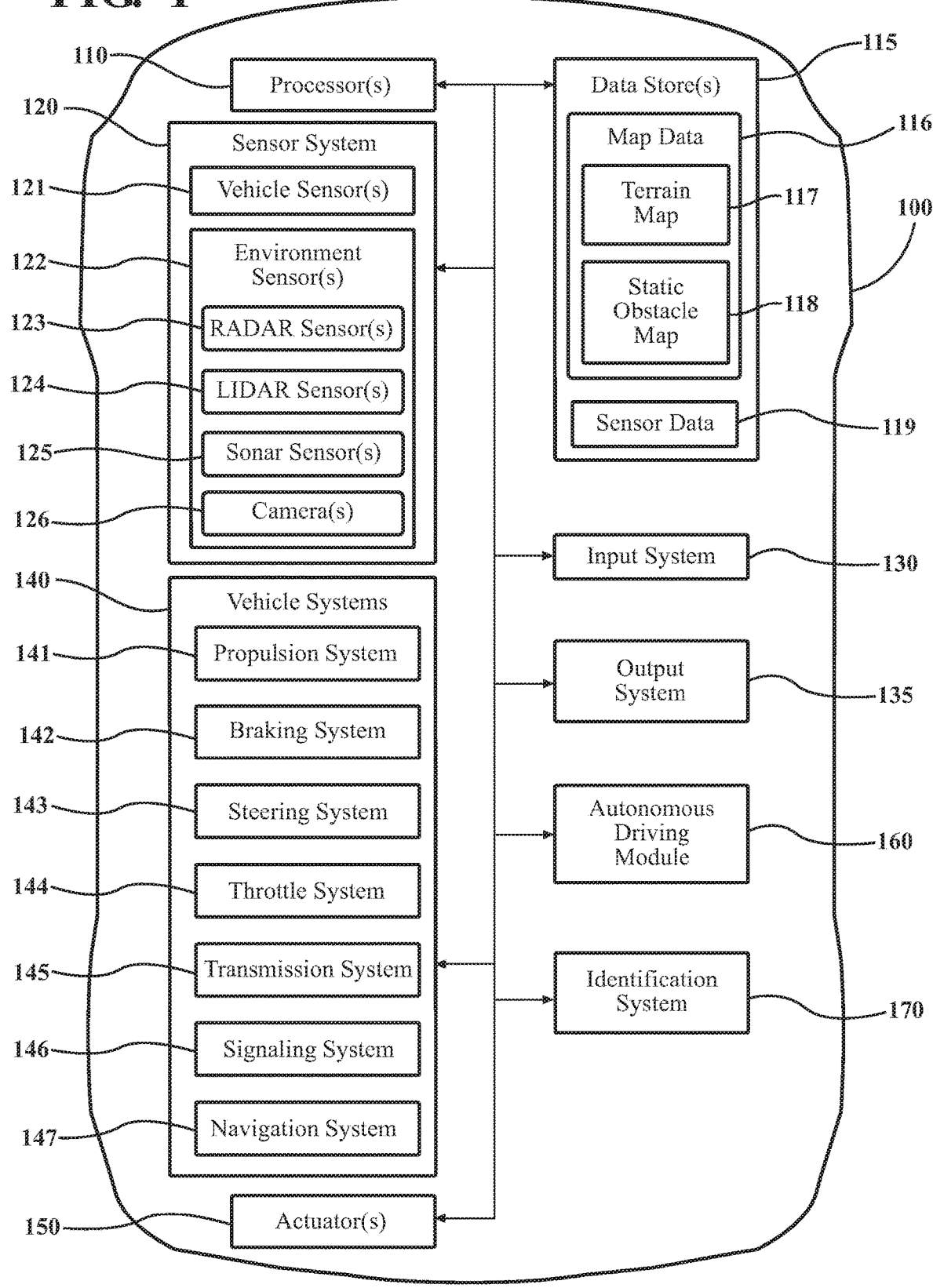
FIG. 1 illustrates one embodiment of a vehicle within which systems and methods disclosed herein may be implemented.

Systems, methods, and other embodiments associated with an improved approach to classifying objects depicted in a scene are disclosed herein. As previously noted, perceiving aspects of the surrounding environment can represent different challenges in relation to identifying various classes of objects. Although a system may be able to generally distinguish between separate clusters of points associated with different objects, providing classifications of the separate objects can be a significant difficulty. Consider that a segmentation model may handle grouping (also referred to as segmenting or clustering herein) or otherwise separating portions of sensor data associated with a particular object while a separate ontological detector may classify the segmented objects. The separate models function differently with the segmentation model relying on various factors that do not necessarily involve specific training for separate classes. By contrast, the ontological detector identifies objects according to a trained ontology (i.e., known set of classes) for which the ontological detector may undergo a supervised training process that uses a plurality of training examples of data for objects with corresponding annotations of the classes. In yet a further aspect, the model may otherwise simply indicate whether or not an object is present and may further provide determinations about attributes of the object (e.g., dimensions, features, etc.) as a mechanism of capturing observations of unknown/unclassified objects but still providing useful observations.

As previously noted, because acquiring sufficient training examples for all possible classes is generally an arduous task, the ontology of the ontological detector may be limited to common object classes that are most closely associated with a particular application in which the ontological detector is employed (e.g., roadway scenes, interior scenes, etc.). Therefore, in one embodiment, an identification system is disclosed that improves a process for classifying objects in a scene. For example, in one arrangement, the identification system employs a novel training approach that functions to identify and aggregate information about unknown object classes (e.g., observations of unknown objects and associated features) to improve an ontology of the ontological detector. Moreover, the identification system may also provide relevant associations with known classes for unknown objects in order to provide secondary classifications that facilitate awareness of the object even though a precise class may be unknown.

In general, the present approach involves using the ontological detector trained with a defined ontology (i.e., known set of classes) to acquire additional information about unknown classes in order to subsequently expand the ontology and improve classification of further objects. Accordingly, as the ontological detector is acquiring data about objects and classifying the objects to, for example, provide awareness to an associated device (e.g., autonomous robot) about the surroundings, some objects may have a classification that is not previously defined in the ontology. Thus, the ontological detector indicates that the class is unknown, and the ontological detector does not provide a specific class label for the object. However, classifying the object as unknown represents an opportunity for the ontological detector to acquire information. That is, the ontological detector is still providing information about the object, which is that the class is not in the ontology. As such, the identification system may then save the object data to a local repository in order to collect information about classes unknown to the ontological detector. Similarly, as the identification system encounters further objects with unknown classifications, the system can aggregate the objects in the repository.

Moreover, the ontological detector may further associate the object with a known class as a manner of providing a general classification without being able to precisely classify the object. For example, in an instance where a class for an object is unknown, but the object has features similar to a vehicle, the detector may indicate that the object is a vehicle-like or dynamic object that generally approximates the class of object without actually knowing the class of the object. By providing an approximation of the class, associated systems may then extrapolate likely behaviors of the class to the unknown object, thereby improving further predictions and/or responses associated with the unknown object. Additionally, the identification system may also associate similar unknown objects together in this way to provide groups of objects that possibly belong to the same classes.

In any case, subsequently, the disclosed system, in one or more arrangements, may use the object data for the unknown objects as training data to train the ontological detector on the unknown classes. For example, the disclosed system may include one or more additional mechanisms for classifying the unknown object data, such as manual annotators, additional models, and so on. In general, the additional mechanisms are more robust, and thus capable of classifying the unknown objects, but may not be suited for implementation within a device in the same manner as the ontological detector. Thus, the additional annotators (e.g., humans manually identifying the objects), and/or the additional models (e.g., models with more robust ontologies) may execute in a separate training environment (e.g., offline environment, cloud-based environment) to label the unknown objects and produce the training data. As one example, the disclosed system may provide 1000 unknown instances that are clustered together (i.e., are similar). The system further may indicate that 300 of the noted examples are likely the same object. Thus, an annotator (e.g., manual annotator or otherwise) can annotate at least a portion of the subset and then apply the label for the identified object to the others as a way of labeling the associated objects. Once the training data is available, the system can expand the ontology by further training the ontological detector using the collected training data. In this way, the system improves the ability of the ontological detector to identify various classes of objects while providing intermediate remedies for unknown object classes through the process of associating unknown objects with known classes to facilitate the handling of these objects.

Referring to FIG. 1, an example of a vehicle 100 is illustrated. As used herein, a "vehicle" is any form of transport. In one or more implementations, the vehicle 100 is an automobile. While arrangements will be described herein with respect to automobiles, it will be understood that embodiments are not limited to automobiles. In some implementations, the vehicle 100 may instead be any electronic device that may be related to transportation, entertainment, communication, etc. and that, for example, perceives an environment according to images, point clouds, or another means of perception. In yet further embodiments, the vehicle 100 may instead be a statically mounted device, an embedded device, or another device that provides perceptions about a surrounding environment according to acquired sensor data.

In any case, the vehicle 100, as described herein, also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an identification system 170 that functions to implement one or more models to process sensor data 250 into observations about objects in a surrounding environment/scene. Moreover, while depicted as a standalone component, in one or more embodiments, the identification system 170 is integrated with the autonomous driving module 160, the camera 126, the LiDAR 124, or another component of the vehicle 100. The noted functions and methods will become more apparent with a further discussion of the figures.

Figure 2:
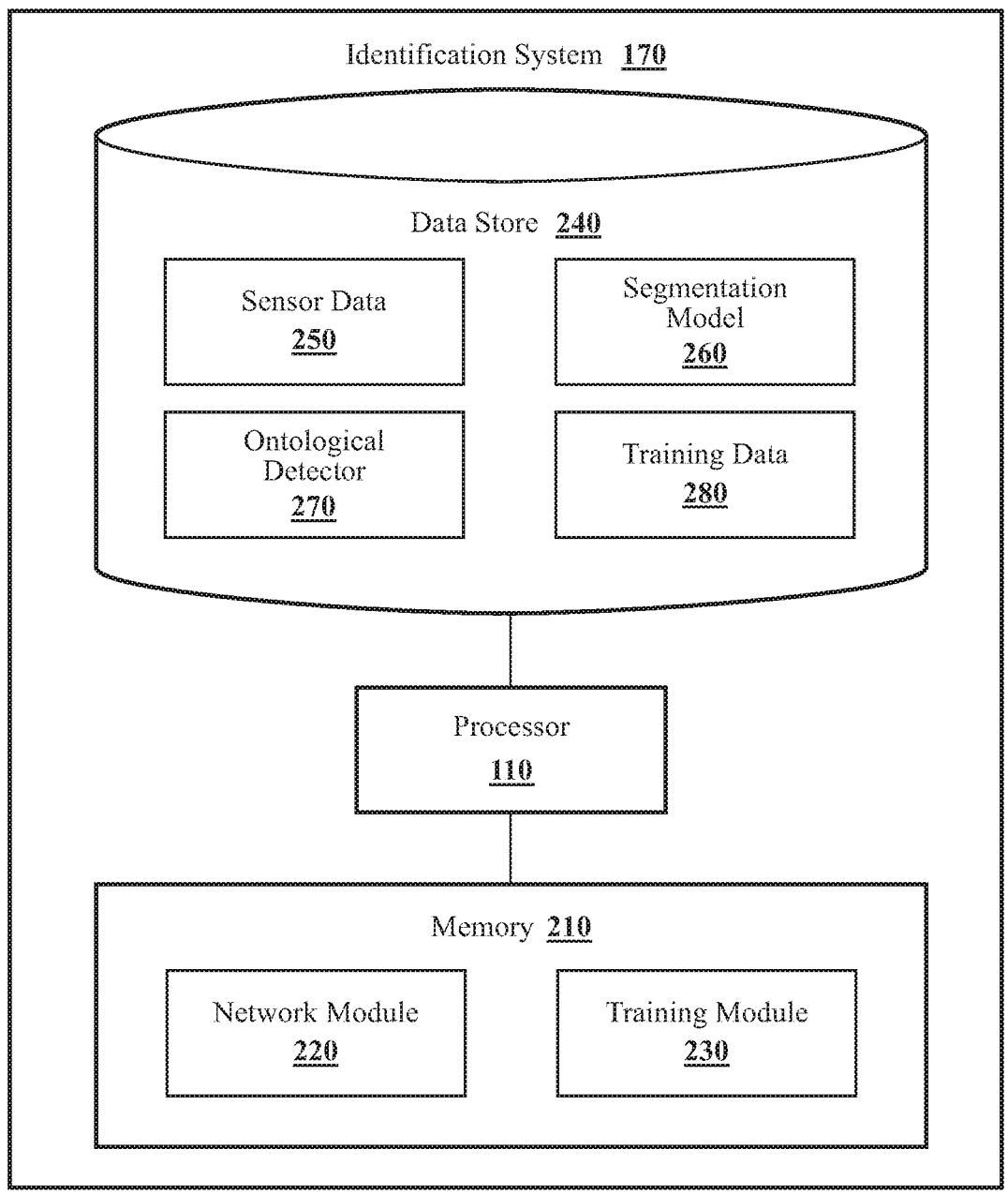
FIG. 2 illustrates one embodiment of an identification system that is associated with classifying objects and aggregating training examples for objects with an unknown classification.

With reference to FIG. 2, one embodiment of the identification system 170 is further illustrated. The identification system 170 is shown as including a processor 110. Accordingly, the processor 110 may be a part of the identification system 170, or the identification system 170 may access the processor 110 through a data bus or another communication path. In one or more embodiments, the processor 110 is an application-specific integrated circuit (ASIC) that is configured to implement functions associated with a network module 220 and a training module 230. In general, the processor 110 is an electronic processor such as a microprocessor that is capable of performing various functions as described herein. While illustrated as a local resource, in various embodiments, the processor 110 may be a cloud-based resource that is remote from the system 170. In one embodiment, the identification system 170 includes a memory 210 that stores the network module 220 and the training module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that, when executed by the processor 110, cause the processor 110 to perform the various functions disclosed herein. Additionally, it should be appreciated that while the network module 220 and the training module 230 are illustrated as both being present in the memory 210, in one or more embodiments, the training module 230 may operate at least partially on a remote system, such as a cloud-based system for training models.

Furthermore, in one embodiment, the identification system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, a segmentation model 260, an ontological detector 270, and training data 280, along with, for example, other information that is used by the modules 220 and 230.

With reference to FIG. 2, the network module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. Thus, the sensor data 250 associated with an observation generally portrays aspects present within a scene in which the vehicle 100 is present. As provided for herein, the network module 220, in one embodiment, acquires sensor data 250 that includes at least one of camera images, point cloud data, radar returns, IR images, and so on. In further arrangements, the network module 220 acquires the sensor data 250 from further sensors as may be suitable for identifying objects in the scene.

Accordingly, the network module 220, in one embodiment, controls the respective sensors to provide the data inputs in the form of the sensor data 250. Additionally, while the network module 220 is discussed as controlling the various sensors to provide the sensor data 250, in one or more embodiments, the network module 220 can employ other techniques to acquire the sensor data 250 that are either active or passive. For example, the network module 220 may passively sniff the sensor data 250 from a stream of electronic information provided by the various sensors to further components within the vehicle 100. Moreover, the network module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors. In one or more arrangements, the network module 220 may separately process data from different sensors/sources into a common format, derive additional determinations from the sensor data 250, and/or perform other functions using the sensor data 250 prior to fusing the sensor data 250 into a common set of data that is provided into the segmentation model 260.

Moreover, the network module 220, in one embodiment, controls the sensors to acquire the sensor data 250 about an area that encompasses 360 degrees about the vehicle 100 in order to provide a comprehensive assessment of the surrounding environment. Of course, in alternative embodiments, the network module 220 may acquire the sensor data about a forward direction or another region in isolation when, for example, the additional regions are not scanned or otherwise relevant.

With further reference to FIG. 2, the identification system 170 further includes the segmentation model 260, and the ontological detector 270. In one or more arrangements, the segmentation model 260 performs one of instance segmentation and clustering. In general, the particular approach that is undertaken depends, for example, on the form of the sensor data 250. That is, the segmentation model 260 implements an instance segmentation approach where the sensor data is a two-dimensional image comprised of pixels or a similar form of data. By contrast, the segmentation model 260 implements a clustering routine where the sensor data 250 is a three-dimensional point cloud or a similar form of data, including data points throughout a three-dimensional space. In any case, the segmentation model 260 functions to identify the discrete objects present in a scene and segment data from the sensor data 250 associated with each object. The segmentation model 260 may provide the segmented data as an output or may simply label or otherwise mark (e.g., with a bounding box) a portion of the sensor data 250 associated with each different object.

In various approaches, the segmentation model 260 is a machine learning algorithm that may have an encoder-decoder architecture or another architecture that is suitable for identifying patterns in the sensor data 250 and grouping data points associated with distinct objects together. For example, the segmentation model 260, in various implementations, may be a centroid-based algorithm, a connectivity-based algorithm, a density-based algorithm (e.g., density-based spatial clustering of applications with noise (DBSCAN)), a k-means clustering algorithm, a Gaussian Mixture Model (GMM), a principal component analysis (PCA) algorithm, a Siamese network, and so on.

Similarly, the ontological detector 270 may also be a machine learning model. However, the form of the ontological detector 270 may vary in comparison to the segmentation model 260. For example, the ontological detector 270 may be a convolutional neural network (CNN) or another model that performs a dimensionality reduction on the segmented data to produce a classification for the object. Thus, the ontological detector 270 is trained to recognize objects of a particular ontology. The ontology is generally a set of classes for objects such as, vehicle, pedestrian, dog, traffic sign, etc. The level of specificity of the ontology may vary according to the particular implementation by generally corresponds with broader classifications (e.g., vehicle, sign, etc.) as opposed to particular types of each class (e.g., sedan, convertible, truck, etc.).

The ontological detector 270 acquires the ontology through a training process, which is, for example, a supervised training process. The supervised training process uses a set of training data, such as the training data 280, that includes a multiplicity of examples for each class in the ontology of the detector 270 in order to ensure that the detector 270 has a sufficient number of samples from which to learn features of the different classes. As the identification system 170 trains the detector 270 using the training data 280, the training module 230 adapts various hyper-parameters in the detector 270 according to a loss function that quantizes the accuracy of decisions output by the detector 270 in relation to known class labels of samples in the training data 280. In this way, the ontological detector 270 learns the particular ontology.

Because training the ontological detector 270 on a plurality of different classes can be computationally extensive and requires extensive samples for each class, the training data 280 can become quite robust. Thus, as mentioned previously, the ontology for the detector 270 may initially include a limited set of classes due to, for example, a lack of training examples, which the identification system 170 can then expand through acquisition of samples when in operation, as will be discussed further subsequently.

Figure 3:
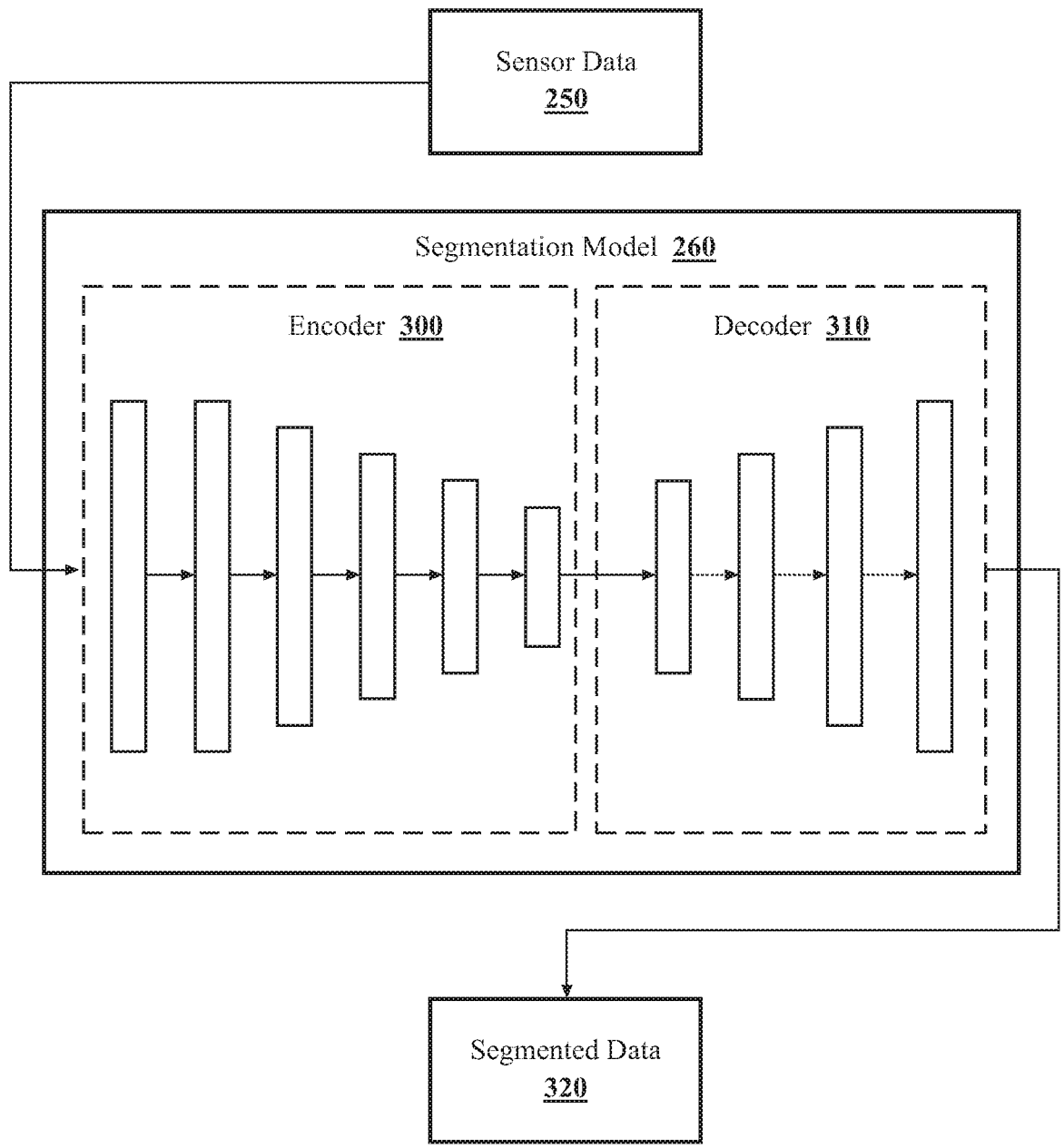
FIG. 3 is a diagram illustrating one embodiment of a segmentation model.
Figure 4:
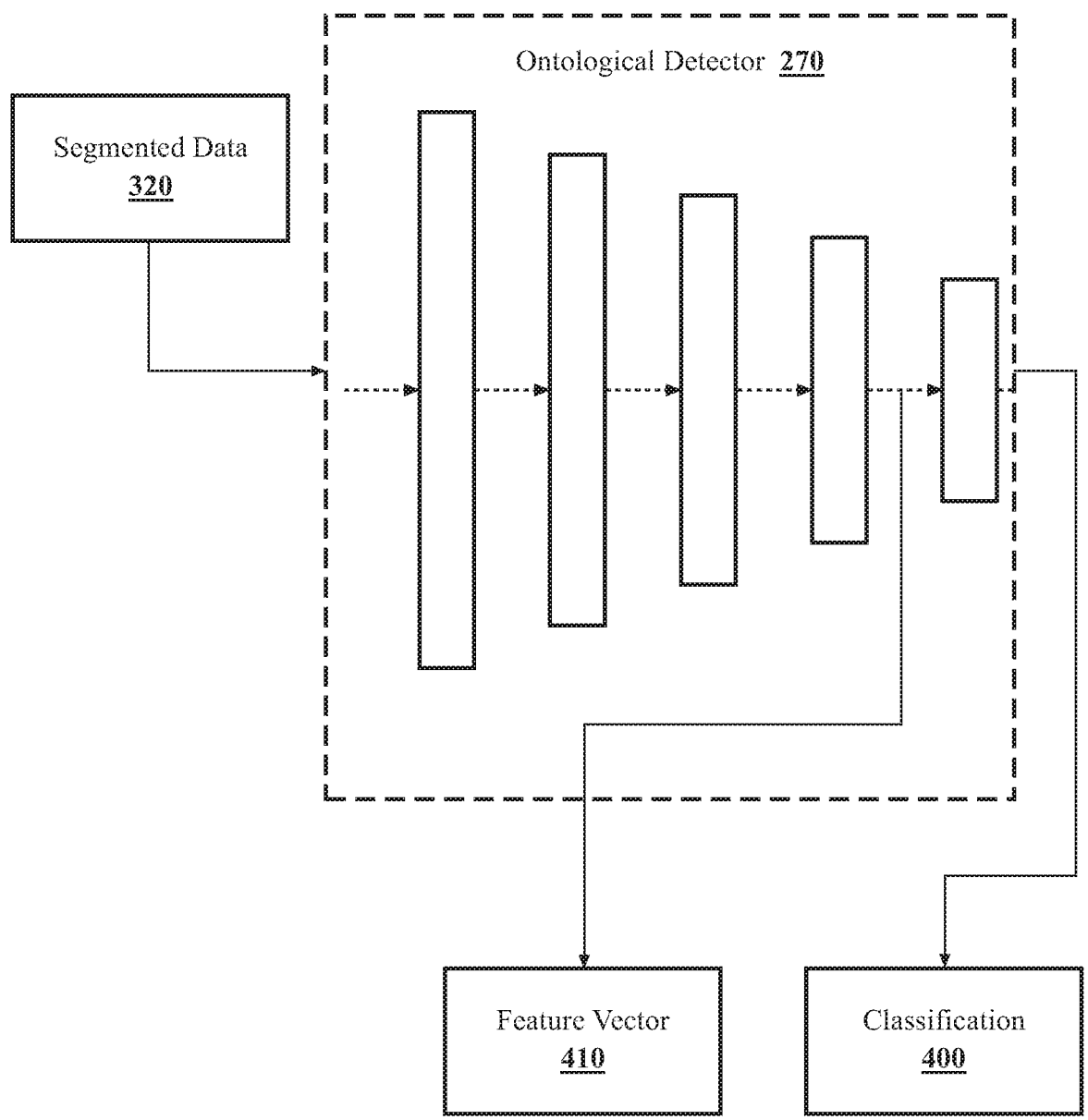
FIG. 4 is a diagram illustrating one embodiment of an ontological detector.

As an additional explanation of one embodiment of the segmentation model 260 and the ontological detector, consider FIG. 3 and FIG. 4. FIG. 3 illustrates a detailed view of one implementation of the segmentation model 260. In one embodiment, the segmentation model 260 has an encoder/decoder architecture. The encoder/decoder architecture generally includes a set of neural network layers, including convolutional components (e.g., 2D and/or 3D convolutional layers forming an encoder) that flow into deconvolutional components (e.g., 2D and/or 3D deconvolutional layers forming a decoder). While not illustrated in FIG. 3, the segmentation model 260 may be an autoencoder that further includes a latent space between the encoder 300 and the decoder 310, which is generally a feature space that functions as a mapping of different features. In any case, the encoder 300 accepts the sensor data 250, such as a point cloud produced by a LiDAR, as an electronic input and processes the three-dimensional data to extract clusters of points, which are represented as the segmented data 320. The segmented data 320 is, in general, a portion of the original sensor data 250 associated with a single object depicted in the sensor data 250. While the segmented data 320 is discussed in relation to a single object, it should be appreciated that the model 260 may produce a separate set of segmented data for each object represented in the sensor data 250.

As such, encoding layers that form the encoder 300 function to, for example, encode features of the sensor data 250 that provide cues to determine cluster/segment associations. In one embodiment, the decoder 310 adapts dimensions of encoded feature vectors to extract the previously encoded spatial information in order to derive the clusters and form the segmented data 280 according to learned correlations associated with the encoded features. That is, the decoding layers generally function to up-sample the previously encoded features into the clusters from which the model 260 can then provide the segmented data 280. Thus, the decoder 310 functions to decode the features back to the appropriate spatial dimensions and, for example, project the determinations against the original sensor data 250. In this way, the segmentation model 260 can produce the segmented data 320. While a particular encoder/decoder architecture is generally illustrated, the segmentation model 260 may take different forms and generally functions to process the sensor data 250 into the segmented data 320 thereby identifying discrete objects within an observed scene.

Continuing to FIG. 4, one embodiment of the ontological detector 270 is illustrated. The ontological detector 270 itself is, in one example, a convolutional neural network (CNN) or another machine learning model that performs dimensional reduction of the input data (i.e., the segmented data 320) to produce a classification 400. As previously noted, the ontological detector 270 is trained to recognize a particular ontology (i.e., known classes). Thus, the ontological detector 270 produces a classification 400 for the segmented data 320 indicating a particular one of the classes. When the classification 400 of the object depicted in the segmented data 320 is not known, the detector 270 may provide an indicator explicitly specifying the class as unknown.

In further embodiments, the detector 270 may instead or in addition to specifying the class is unknown, provide a feature vector 410 that describes the object, as represented in the segmented data 320. For example, even though the ontological detector 270 may not include the class of the object in the ontology, the detector 270 still characterizes the segmented data 320 by producing the feature vector 410. However, when the feature vector 410 does not satisfy a known combination of features to an adequate extent as may be learned within a SoftMax layer of the detector 270 or another combination of layers, the detector 270 indicates that the object is of an unknown class. Yet, the feature vector 410 is a characterization of the object that can, in one or more approaches, be subsequently used as a mechanism for identifying the object and associating the object with other similar objects. It should be appreciated that the feature vector 410 is a vector including multiple elements that describe different features of an object in a numerical or other symbolic form. In this way, the ontological detector 270 can still associate like objects even without knowing the exact classification.

As an additional note, while the segmentation model 260 and the ontological detector 270 are discussed as discrete units separate from the network module 220, the segmentation model 260 and the ontological detector 270 are, in one or more embodiments, generally integrated with the network module 220. That is, the network module 220 functions to execute various processes of the model 260 and the detector 270 and uses various data structures of the model 260 and the detector 270 in support of such execution. Accordingly, in one embodiment, the network module 220 includes instructions that function to control the processor 110 to generate the segmented data 320 and the classification 400.

Figure 5:
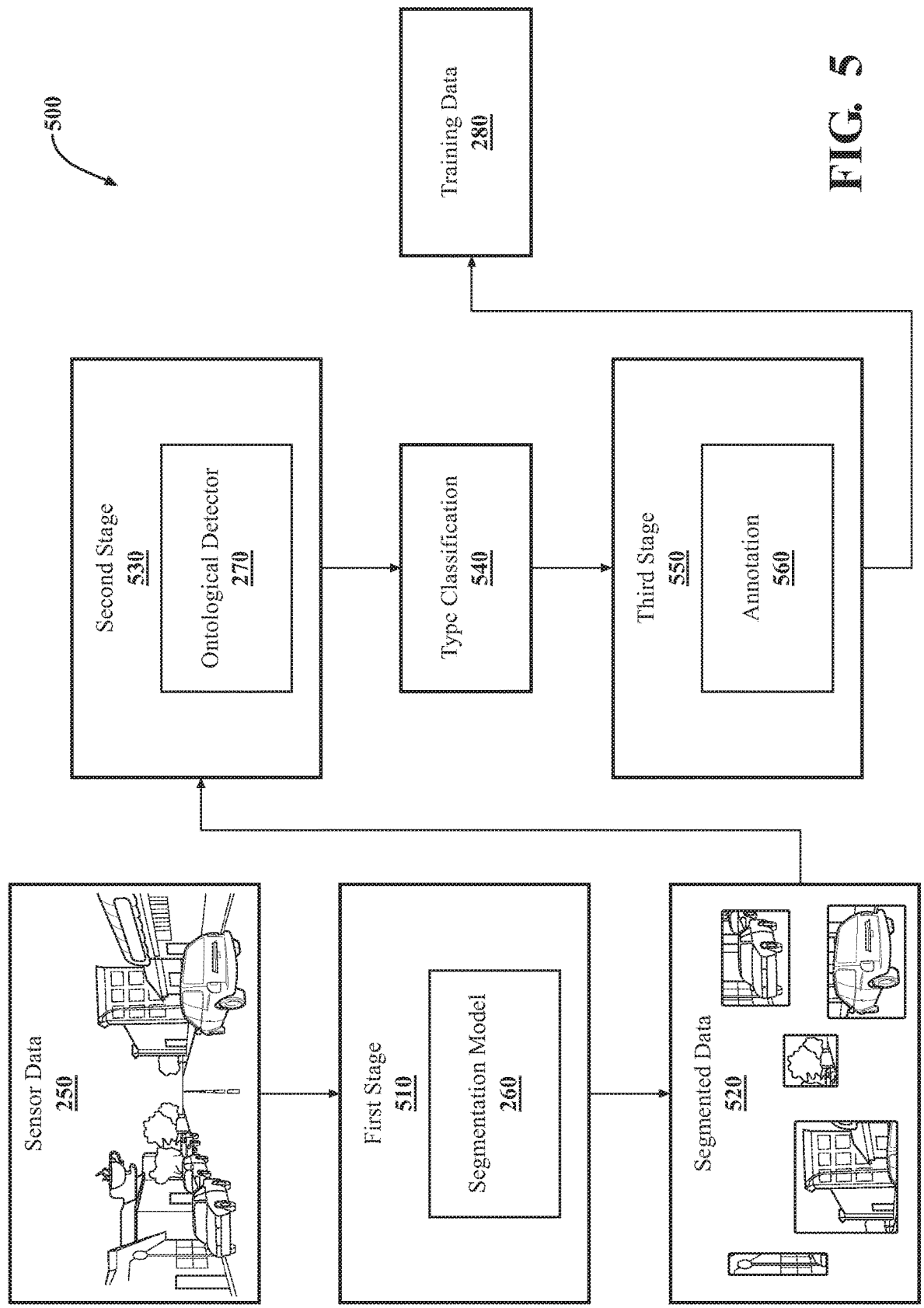
FIG. 5 illustrates one embodiment of an operating architecture for the ontological detector.

As a further explanation of the relationship between the segmentation model 260, the ontological detector 270, and the noted training process, consider FIG. 5 in relation to components previously described in relation to FIGS. 2-4. FIG. 5 illustrates one embodiment of an operating environment 500 that denotes various relationships between the segmentation model 260, the ontological detector 270, and training data 280. As shown in FIG. 5, a first stage 510 includes the network module 220 receiving or otherwise acquiring the sensor data 250 as previously described. The network module 220 processes the sensor data 250 using the segmentation model 260 to produce the segmented data 520. As shown in FIG. 5, the segmentation model 260 may produce many separate instances of objects from the original sensor data 250.

Accordingly, at a second stage 530, the network module 220 uses the segmented data 520 as electronic inputs to the ontological model 270, As indicated previously, the ontological detector 270 is trained for an ontology of objects, which may be limited to a specific set of classes. As shown in FIG. 5, the segmented data 520 includes vehicles, a house, a traffic sign, and a tree. While the segmentation model 260 can effectively identify that the data points correspond to distinct objects, the ontological detector 270 does not likely include all of the noted objects within the ontology. For example, the ontology likely includes aspects specific to a context of the vehicle 100, which is associated with roadway scenes. As such, while the ontological detector 270 may be able to accurately classify traffic signs and vehicles in providing the classification 540, the ontology may not include houses, and vegetation, such as trees.

Thus, the ontological detector 270 provides type classifications 540 for the known objects in the segmented data 520 while indicating that the objects not in the ontology are unknown. The type classifications 540 are, in general, annotations provided along with the associated segmented data 520 in the form of a label or other indicator that specifies the associated class. Accordingly, when the ontological detector 270 determines that the class is unknown for an object, the type classification 540 may instead indicate "unknown." Alternatively, the network module 220 generates the type classification 540 for unknown objects to include a feature vector associated with processing the object from an intermediate stage within the detector 270. As noted previously, even though the detector 270 is not trained to detect various classes, the detector 270 still produces the feature vector for objects of unknown classes. Thus, the feature vector for an object of an unknown class generally characterizes features of the object in relation to classes that are within the ontology, which can be useful in providing secondary classifications for the unknown objects.

In one approach, the network module 220 implements a similarity metric to determine how similar or dissimilar a feature vector for the unknown object is in comparison to feature vectors for known classes. In one arrangement, the similarity metric is a Euclidean distance, a Mahalanobis distance, or another metric that identifies a similarity of the unknown classification with one of the known classes of the ontological detector. In one or more aspects, the similarity metric may operate over the feature vector for the unknown object in relation to a latent/feature space for defined classes of the ontology. By way of example, the segmented data 520 specifying the tree may be an unknown class to the ontology. However, because the tree generally exhibits an upward linear form, the feature vector for the tree may be somewhat similar to a feature vector for a traffic sign. Thus, the network module 220 may label the tree as a traffic sign-like object.

From this similarity determination, the network module 220, in one embodiment, provides a label for the unknown object indicating the similarity with the known class. Accordingly, further systems, such as the autonomous driving module 160, may characterize the unknown object according to characteristics of the similar class. In the instance of the tree/sign example, the autonomous driving module 160 may apply known behaviors of signs to the tree, such as identifying that the tree is likely a static object that is often proximate to the side of a roadway. Similarly, other objects such as different types of animals may be classified as similar objects, and the various systems of the vehicle 100 can then extrapolate known behaviors for the known classes to the similar objects as associated via the determinations using the feature vectors by the network module 220.

In any case, the training module 230 provides the segmented data for the objects with unknown classifications into the data store 240 or another electronic storage of the identification system 170. As the vehicle 100 proceeds with operations, the identification system 170 may acquire a plurality of different samples of unknown objects in this way. Accordingly, in one aspect, the training module 230 uses the feature vector to associate the feature vector with other objects having an unknown class but having a similar or the same feature vector.

As an additional aspect of characterizing the unknown objects in relation to the known classes, the network module 220 may further characterize the unknown objects relative to each other. That is, the network module 220, in one aspect, uses the feature vectors for the different unknown objects to determine similarities therebetween from which the network module 220 can associate different ones of the unknown objects as being similar and likely of a same class. As set forth above, the network module 220 may employ the same or a related similarity metric (e.g., Euclidean distance) in order to compare and determine correlations between unknown objects.

Continuing with FIG. 5 and the operating environment 500, at a third stage 550, the previously acquired samples having unknown classes are further processed to produce annotations 560 identifying classes for the previously unknown objects. For example, the training module 230 may generate the annotations 560 in multiple different ways depending on a particular implementation. In one approach, the training module 230 implements a secondary model that is trained according to a separate ontology than that of the ontological detector. In general, the separate ontology may be inclusive of the ontology of the detector 270, distinct, or share a portion of the same classes. Additionally, the secondary model may be specific to a certain single class (e.g., birds), and, thus, may provide highly accurate determinations in relation to a single class. In such an instance, the training module 230 may execute a plurality of different models that are each specific to a single class when annotating the unknown objects. In any case, the training module 230 may implement one or more secondary models 230 and execute the model(s) over the unknown objects to automatically generate the annotation(s) 560.

In a further aspect, the training module 230 may acquire electronic inputs identifying the classes for the unknown objects that correspond with, for example, manual inputs of a human annotator. For example, the training module 230 may present the segmented data 520 via an electronic display to the annotator. In response to the display of the data 520, the annotator provides the annotation 560 identifying the class for the unknown object. In one approach, the training module 230 may provide a set of possible classes from which the annotator selects the appropriate class, or the annotator uses an electronic input device to provide the class. In any case, the training module 230 acquires the annotation 560 via the electronic input and uses the annotation 560 to identify the unknown object.

Moreover, the training module 230 may extrapolate the annotation 560 for one object to other unknown objects according to, for example, a similarity between the newly annotated object and the other unknown objects. That is, as noted previously, the network module 220 may group or otherwise correlate unknown objects according to similarities between the feature vectors. Thus, if the training module 230 determines the annotation 560 for one unknown object in the group, then the same annotation logically extends to the other similar unknown objects when, for example, the other unknown objects are within a threshold similarity (e.g., Euclidean distance). The identification system 170 may define the threshold similarity according to a level of confidence in the determination of the similarity. That is, the identification system 170 may define a ninety percent confidence interval that corresponds to a defined threshold similarity for cascading the annotation 560 to other unknown objects.

In any case, whether the training module 230 acquires the annotation 560 through an automatic mechanism, such as a secondary classification model, or through a manual annotator, the training module 230 can improve the efficiency of labeling many separate objects by extrapolating the annotation 560 to the other unknown objects that are similar. In this way, the training module 230 generates the training data 280 from the originally unknown objects to provide additional training samples on classes not represented in the ontology of the ontological detector 270.

Accordingly, the training module 230 may then train the ontological detector 270 using the training data 280 to expand the ontology of the detector 270. In general, the training process is a supervised training process that uses annotated training samples to iteratively execute the ontological detector and compare results from the detector with the annotations. This process of comparison functions to assess the accuracy of the ontological detector and iteratively propagate updates through the detector 270 to achieve the training.

Figure 6:
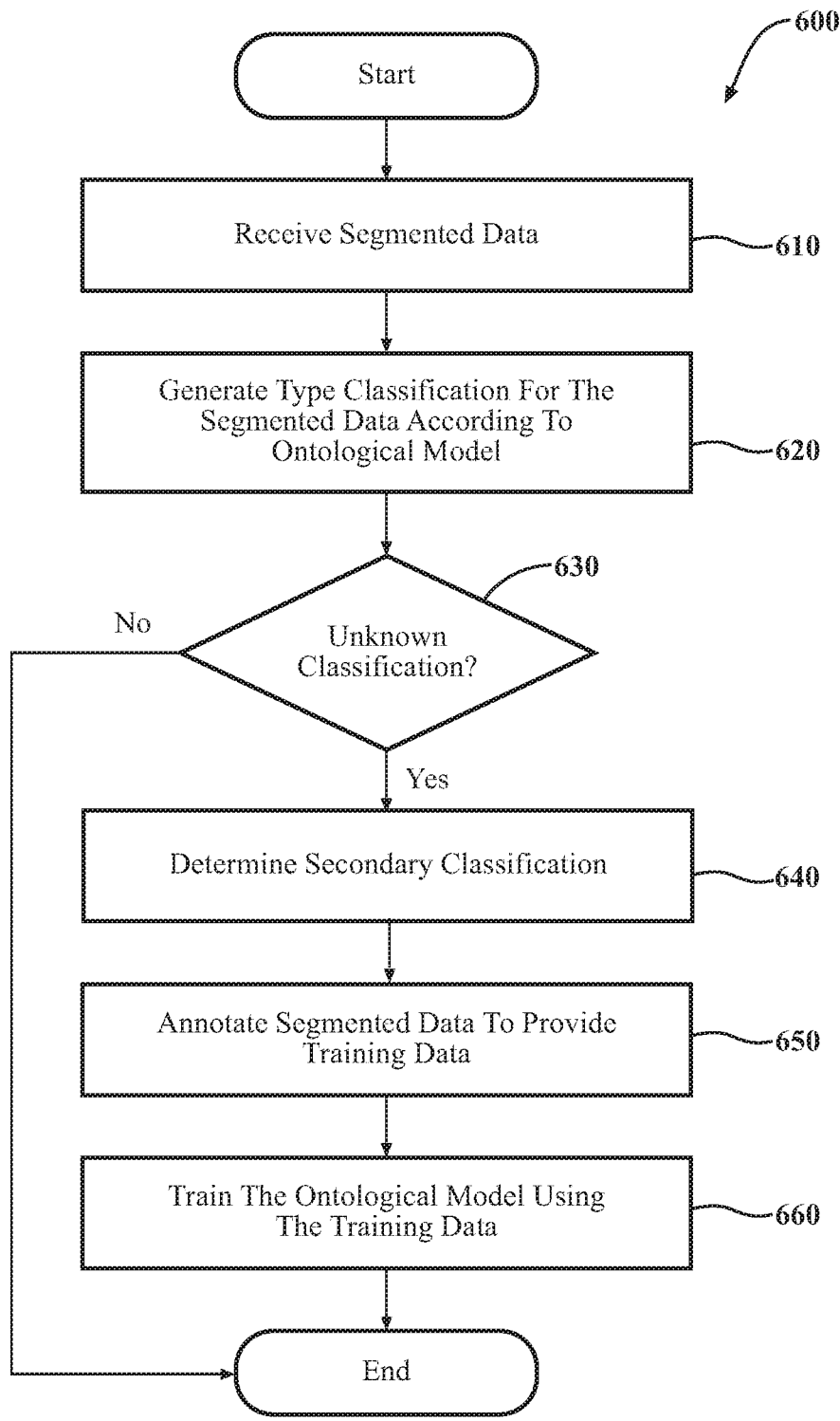
FIG. 6 is a flowchart illustrating one embodiment of a method for improving the training of an ontological detector by aggregating examples for objects having unknown classes.

Additional aspects of improving the classification of unknown objects will be discussed in relation to FIG. 6. FIG. 6 illustrates a flowchart of a method 600 that is associated with improving the classification of objects depicted in a scene. Method 600 will be discussed from the perspective of the identification system 170. While method 600 is discussed in combination with the identification system 170, it should be appreciated that the method 600 is not limited to being implemented within the identification system 170 but is instead one example of a system that may implement the method 600.

At 610, the network module 220 receives the segmented data from the segmentation model 260. In one embodiment, the network module 220 initially receives the sensor data 250 from at least one sensor in the vehicle 100 and proceeds to generate the segmented data by using the segmentation model 260 to, for example, extract segmented data for separate, distinct objects from the sensor data 250. As previously noted, the segmentation model 260 may take different forms but generally functions to identify discrete aspects of a scene from the sensor data 250 through an instance segmentation process or a clustering process as may be defined according to a form of the sensor data 250 (e.g., 2D image data versus 3D point cloud data).

At 620, the network module 220 generates a type classification of a detected object represented by the segmented data. In one embodiment, the network module 220 implements the ontological detector 270 to process separate pieces of the segmented data associated with different object instances. Thus, the ontological detector 270 provides the type classification (i.e., the class of the object) according to the ontology (also referred to as the detector ontology herein) of known classes. The type classification functions to facilitate further determinations, but the vehicle 100 and/or other systems that may seek to gain awareness about the surrounding environment.

At 630, the network module 220 determines whether the type classification indicates that the segmented data represents an object having an unknown classification. In one approach, the network module 220 analyzes an output of the ontological detector 270 to determine whether the object is unknown. For example, the ontological detector 270 may provide an explicit unknown output, may provide a probability distribution among known classes, and so on. In any case, the network module 220 controls the detector 270, and, thus, can parse the output to determine whether the object is unknown or is classified within the detector ontology. When the object is known, the network module 220 may proceed with performing additional functions, including providing the type classification to other various systems (e.g., autonomous driving module 160). By contrast, when the object is unknown, the network module 220 may proceed with different actions that include providing the type classification and/or additional information to the training module 230.

At 640, the network module 220 determines a secondary classification for the detected object. In one embodiment, the network module 220 acquires a feature vector, as discussed previously, from the ontological detector 270 when the object has an unknown class. As noted, the feature vector characterizes various aspects of the object, and, thus, provides insights into the characteristics of the object. As such, in one or more approaches, the network module 220 determines the secondary classification that generally approximates a potential associated or similarity of the detected object with a known class and/or with other unknown objects. For example, the network module 220, in one arrangement, calculates a similarity metric using the feature vector in comparison to feature vectors of other objects and/or in comparison to known classes as mapped onto a defined feature space. The similarity metric generally identifies correlations between the feature vectors and, thus, correspondence between objects and classes. As such, when the feature vector of the unknown object corresponds to within a defined threshold value of one of the classes in the ontology, the network module 220 annotates the object as being similar to the class but not explicitly of the class. In a similar manner, the network module 220 can associate groups of unknown objects to better characterize the unknown objects together.

At 650, the training module 230 annotates the segmented data for the unknown object to provide the training data 280. In one approach, the training module 230 uses a secondary source to classify the segmented data that is distinct from the ontological detector 270. As previously outlined, the training module 230 may implement a secondary model. The secondary model may be a single model that is trained according to a broad ontology of classes, a set of models trained on different ontologies (e.g., cascaded classifiers), and so on. Moreover, the secondary source may also include an annotator that provides the classification via electronic inputs without implementing the secondary model. In any case, the training module 230 acquires a classification for the unknown object for which the segmented data is labeled and provided as at least part of the training data 280. Furthermore, the training module 230 may also extrapolate the label to other associated unknown objects via the similarity metric, as previously explained. Accordingly, for other unknown objects having a similar feature vector as the newly labeled object, the training module 230 may extrapolate the label to the objects in order to more efficiently annotate the unknown objects. In this way, the identification system 170 generates new training data for classes that are outside of the detector ontology.

At 660, the training module 230 trains the ontological detector 270 using at least the training data 280 that includes the newly labeled samples of previously unknown classes. It should be appreciated that the process of training the detector 270 may occur in multiple different ways. That is, the identification system 170 may train the detector 270 locally, or remotely via one or more cloud-based resources (e.g., cloud-computing environment). Additionally, the training itself may also take different forms, such as supervised training, semi-supervised training, and so on. As a further aspect, the ontological detector 270 may train on the new classes within the training data 280 or may retrain on the whole detector ontology without retaining previously learned waits in order to avoid learned aspects that may unintentionally skew learning the new classes. In any case, training with the training data 280 improves the ontological detector by expanding the detector ontology to a broader set of classes.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface. In one or more aspects, the identification system 170 may further leverage cues from the map data (e.g., proximate aspects of the environment with the unknown objects) to facilitate classification or associations of the objects. For example, an object located on a sidewalk is not likely a vehicle but may be a bicycle. Thus, the associations further facilitate identifying objects.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the identification system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the identification system 170, and/or the autonomous driving module(s) 160 may control some or all of these vehicle systems 140 and, thus, may be partially or fully autonomous.

The processor(s) 110, the identification system 170, and/or the autonomous driving module(s) 160 can be operatively connected to communicate with the various vehicle systems 140 and/or individual components thereof. For example, returning to FIG. 1, the processor(s) 110, the identification system 170, and/or the autonomous driving module(s) 160 can be in communication to send and/or receive information from the various vehicle systems 140 to control the movement, speed, maneuvering, heading, direction, etc. of the vehicle 100. The processor(s) 110, the identification system 170, and/or the autonomous driving module(s) 160 may control some or all of these vehicle systems 140.

The processor(s) 110, the identification system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the identification system 170, and/or the autonomous driving module(s) 160 can control the direction and/or speed of the vehicle 100. The processor(s) 110, the identification system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine a position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the identification system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An identification system for improving classification of objects depicted in a scene, comprising:
   one or more processors;
   a memory communicably coupled to the one or more processors and storing:
   a network module including instructions that when executed by the one or more processors cause the one or more processors to:
   generate, using an ontological detector, a type classification of a detected object according to a detector ontology of known classes, wherein the detected object is represented as segmented data from sensor data about a surrounding environment,
   in response to determining that the type classification specifies an unknown class that is not defined in the detector ontology, annotate the segmented data as unknown,
   identify a secondary classification for the detected object according to a similarity of the unknown class with one of the known classes of the ontological detector according to a feature vector about the detected object generated by an encoder of the ontological detector; and
   a training module including instructions that when executed by the one or more processors cause the one or more processors to provide the segmented data to specify that the type classification for the detected object is unknown.

2. The identification system of claim 1, wherein the training module further includes instructions to:
   classify, using a secondary model, the detected object according to the segmented data to generate a training classification that identifies an object class of the detected object, wherein the secondary model is trained according to a separate ontology from the known classes to improve classification of the detected object and identify the unknown class as the object class, and
   generate training data for the ontological detector by annotating the segmented data with the object class to subsequently expand the known classes of the ontological detector using at least the trained data.

3. The identification system of claim 2, wherein the training module includes instructions to generate the training data including instructions to extrapolate the object class to additional objects identified by the ontological detector as having the unknown class according to a similarity between the additional objects and the detected object.

4. The identification system of claim 2, wherein the training module includes instructions to train the ontological detector using at least the training data according to a supervised training process to improve the detector ontology by expanding the known classes to further include at least the training classification of the detected object.

5. The identification system of claim 1, wherein the network module includes instructions to identify the secondary classification for the detected object according to the feature vector by using a similarity metric that determines a distance between the feature vector and features of the known classes within a latent space.

6. The identification system of claim 1, wherein the network module includes instructions to identify the secondary classification including instructions to use the feature vector about the detected object produced from an encoder stage of the ontological detector to identify which of the known classes are similar to the detected object.

7. The identification system of claim 1, wherein the network module includes instructions to:
   receive the sensor data representing the surrounding environment from at least one sensor; and
   identify the detected object from the sensor data according to a segmentation model that determines which data points within the sensor data belong to the detected object to produce the segmented data.

8. The identification system of claim 1, wherein the sensor data is one of: three-dimensional point cloud data and two-dimensional imaging data of the surrounding environment, and wherein the segmented data is generated according to one of: clustering and instance segmentation.

9. A non-transitory computer-readable medium for improving classification of objects depicted in a scene and including instructions that when executed by one or more processors cause the one or more processors to:
generate, using an ontological detector, a type classification of a detected object according to a detector ontology of known classes, wherein the detected object is represented as segmented data from sensor data about a surrounding environment;
in response to determining that the type classification specifies an unknown class that is not defined in the detector ontology, annotate the segmented data as unknown;
identify a secondary classification for the detected object according to a similarity of the unknown class with one of the known classes of the ontological detector according to a feature vector about the detected object; and
provide the segmented data to specify that the type classification for the detected object is unknown.

10. The non-transitory computer-readable medium of claim 9, wherein the instructions further include instructions to:
classify, using a secondary model, the detected object according to the segmented data to generate a training classification that identifies an object class of the detected object, wherein the secondary model is trained according to a separate ontology from the known classes to improve classification of the detected object and identify the unknown class as the object class, and
generate training data for the ontological detector by annotating the segmented data with the object class to subsequently expand the known classes of the ontological detector using at least the trained data.

11. The non-transitory computer-readable medium of claim 10, wherein the instructions to generate the training data include instructions to extrapolate the object class to additional objects classified by the ontological detector as having the unknown class according to a similarity between the additional objects and the detected object, and
wherein the instructions further include instructions to train the ontological detector using at least the training data according to a supervised training process to improve the detector ontology by expanding the known classes to further include at least the training classification of the detected object.

12. The non-transitory computer-readable medium of claim 9, wherein the instructions further include instructions to identify the secondary classification for the detected object according to the feature vector by using a similarity metric that determines a distance between the feature vector and features of the known classes within a latent space.

13. The non-transitory computer-readable medium of claim 9, wherein the instructions further include instructions to:
receive the sensor data representing the surrounding environment from at least one sensor; and
identify the detected object from the sensor data according to a segmentation model that determines which data points within the sensor data belong to the detected object to produce the segmented data,
wherein the sensor data is one of: three-dimensional point cloud data and two-dimensional imaging data of the surrounding environment, and wherein the segmented data is generated according to one of: clustering and instance segmentation.

14. A method of improving classification of objects depicted in a scene, comprising:
generating, using an ontological detector, a type classification of a detected object according to a detector ontology of known classes, wherein the detected object is represented as segmented data from sensor data about a surrounding environment;
in response to determining that the type classification specifies an unknown class that is not defined in the detector ontology, annotating the segmented data as unknown;
identifying a secondary classification for the detected object according to a similarity of the unknown classification with one of the known classes of the ontological detector according to a feature vector about the detected object; and
providing the segmented data to specify that the type classification for the detected object is unknown.

15. The method of claim 14, further comprising:
classifying, using a secondary model, the detected object according to the segmented data to generate a training classification that identifies an object class of the detected object, wherein the secondary model is trained according to a separate ontology from the known classes to improve classification of the detected object and identify the unknown class as the object class; and
generating training data for the ontological detector by annotating the segmented data with the object class to subsequently expand the known classes of the ontological detector using at least the trained data.

16. The method of claim 15, wherein generating the training data includes extrapolating the object class to additional objects classified by the ontological detector as having the unknown class according to a similarity between the additional objects and the detected object.

17. The method of claim 15, further comprising:
training the ontological detector using at least the training data according to a supervised training process to improve the detector ontology by expanding the known classes to further include at least the training classification of the detected object.

18. The method of claim 14,
wherein identifying the secondary classification for the detected object according to the feature vector includes using a similarity metric that determines a distance between the feature vector and features of the known classes within a latent space.

19. The method of claim 14, wherein identifying the secondary classification includes using the feature vector about the detected object produced from an encoder stage of the ontological detector to identify which of the known classes are similar to the detected object.

20. The method of claim 14, further comprising:
receiving the sensor data representing the surrounding environment from at least one sensor; and
identifying the detected object from the sensor data according to a segmentation model that determines which data points within the sensor data belong to the detected object to produce the segmented data,
wherein the sensor data is one of: three-dimensional point cloud data and two-dimensional imaging data of the surrounding environment, and wherein the segmented data is generated according to one of: clustering, and instance segmentation.

* * * * *